United States Patent
Bothorel

(10) Patent No.: US 8,416,732 B2
(45) Date of Patent: Apr. 9, 2013

(54) RADIO COMMUNICATION SYSTEM FOR ACARS MESSAGES EXCHANGE

(75) Inventor: Alain Jean-Michel Bothorel, Balma (FR)

(73) Assignee: Rockwell-Collins France, Blagnac (FR)

( * ) Notice: Subject to any disclaimer, the term of this patent is extended or adjusted under 35 U.S.C. 154(b) by 0 days.

(21) Appl. No.: 12/447,098

(22) PCT Filed: Oct. 23, 2007

(86) PCT No.: PCT/IB2007/004265
§ 371 (c)(1),
(2), (4) Date: Apr. 24, 2009

(87) PCT Pub. No.: WO2008/050241
PCT Pub. Date: May 2, 2008

(65) Prior Publication Data
US 2010/0027461 A1    Feb. 4, 2010

(30) Foreign Application Priority Data
Oct. 24, 2006 (EP) ..................................... 06291648

(51) Int. Cl.
*H04B 7/185* (2006.01)
(52) U.S. Cl. ....................................................... 370/316
(58) Field of Classification Search ................... 370/316
See application file for complete search history.

(56) References Cited

U.S. PATENT DOCUMENTS

2006/0080451 A1*  4/2006  Eckert ........................... 709/230
2006/0252422 A1*  11/2006  Kauffman et al. ............. 455/431

FOREIGN PATENT DOCUMENTS

| WO | 02/065683 | 8/2002 |
| WO | WO 02065683 A2 * | 8/2002 |
| WO | 2004/008277 | 1/2004 |
| WO | 2006/026632 | 3/2006 |
| WO | WO 2006026632 A1 * | 3/2006 |

OTHER PUBLICATIONS

International Search Report dated Apr. 24, 2008, from corresponding PCT application.

* cited by examiner

*Primary Examiner* — Mark Rinehart
*Assistant Examiner* — Maharishi Khirodhar
(74) *Attorney, Agent, or Firm* — Young & Thompson

(57) ABSTRACT

A radio communication system for ACARS messages exchange between an aircraft (2) and a ground center (20) includes in the aircraft a communication management unit (4) having a plurality of interfaces for connecting communication equipments among VHF, HF and SATCOM communication equipments (6, 10, 14), the communication equipments being adapted via respective bi-directional channels to each communicate independently with the ground center (20). The radio communication system further includes a communication unit (24) including emulating elements (44) for emulating a communication equipment when communicating with the communication management unit (4) and wireless access elements (50) for communication with a wireless access point (28) of a ground communication network (30).

4 Claims, 4 Drawing Sheets

RADIO COMMUNICATION SYSTEM FOR ACARS MESSAGES EXCHANGE

Figure 1:
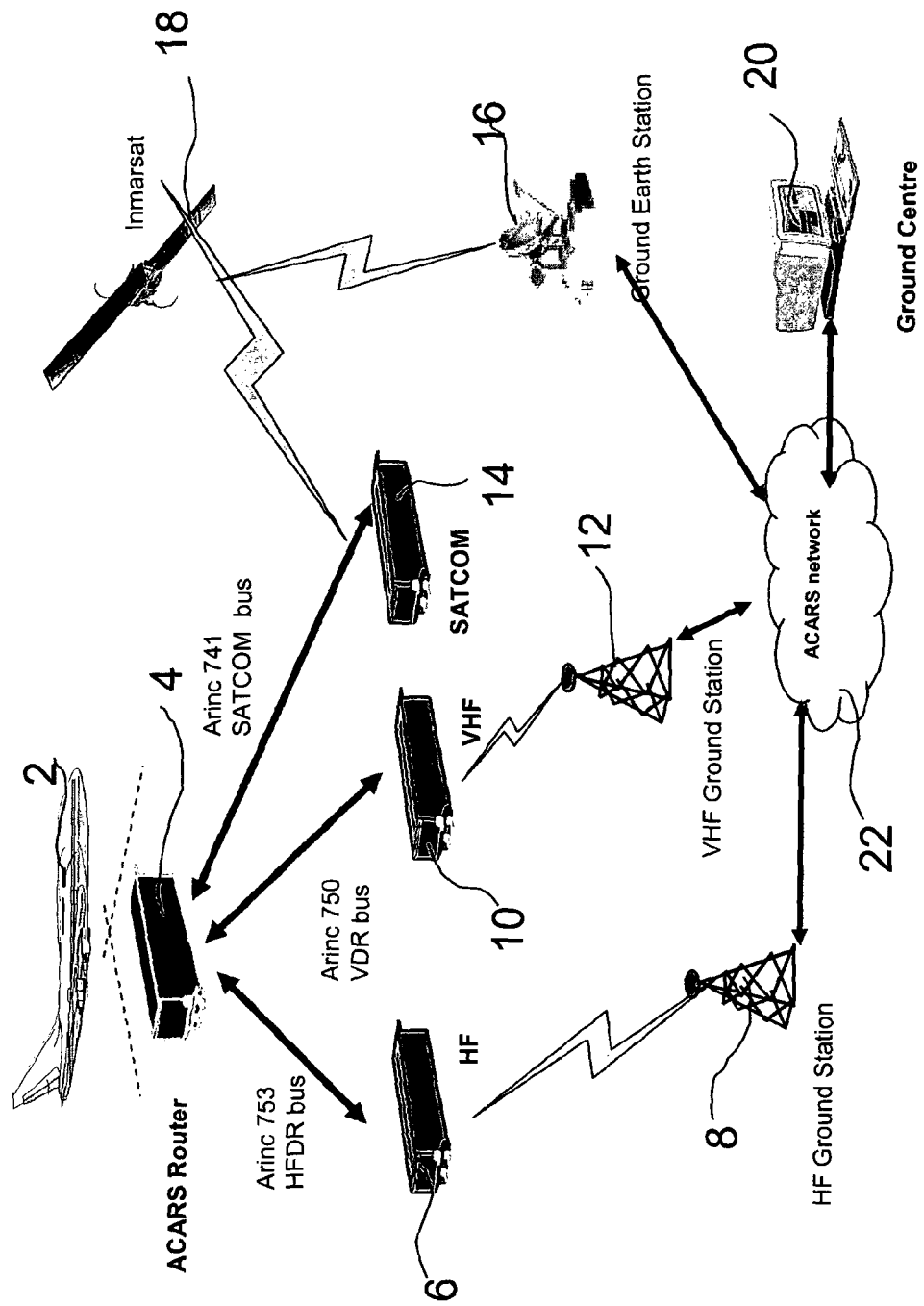

The present invention is related to a radio communication system for ACARS messages exchange between an aircraft and a ground centre for this aircraft.

Communication between an aircraft and its ground centre is carried out using various communication channels. An example of conventional ACARS communications is shown on FIG. 1.

The ACARS is an aeronautical network for transmitting Aeronautical Operational Control (AOC) messages and applications and Air Traffic Services (ATS) messages and applications.

The aircraft 2 is provided with a communication management unit (CMU) 4 which is functionally an ACARS router. This communication management unit 4 is connected via a standard bus, such as an ARINC 429 bus, to various communication equipments themselves connected to antennas (not shown) for radio communication with ground stations. In the example shown, the ACARS is provided with HF communication equipment 6 which allows long range communication (e.g. up to 20 000 kms) with a HF ground station 8. It is also provided with a VHF communication equipment 10 for short range communication (typically 200 kms) with a VHF ground station 12. The VHF channel is the most used channel. The ACARS further comprises a SATCOM communication equipment 14 for any communication range with a ground earth station 16 via a satellite 18.

Each of the ground stations 8, 12, 16 are then able to communicate with the ground centre 20 through a telecommunication network 22, in particular with a dedicated ACARS network, as shown on the figure.

This ACARS has some limitations with respect to the VHF communication. First of all, VHF communication is not well supported or not supported at all in some parts of the world. It may as well not be well supported in some places, such as holiday destinations, where the air traffic is of a low volume during most part of the year but may be very substantial during a few weeks per year.

In such cases, SATCOM communication is used in place of VHF communication. This induces higher communication costs for the airline.

Even in places where VHF communication is well supported, the communication costs are not negligible as, in any case (SATCOM or VHF), the communication makes use of a private network provided by a Datalink Service Provider.

The object of the present invention is to provide a radio communication system for ACARS messages exchange which allows substantial additional savings on communication costs.

The present invention relates to a radio communication system for communication between an aircraft and a ground centre comprising in the aircraft a communication management unit having a plurality of interfaces for connecting communication equipments among VHF, HF and SATCOM communication equipments, the communication equipments being adapted via respective bi-directional channels to each communicate independently with the ground centre, characterized in that said radio communication system further comprises a communication unit having a first interface and a second interface, a first communication link between said first interface and an interface of the communication management unit, and a second communication link between said second interface and an interface of an associated antenna means for communication with the ground centre, said communication unit including emulating means for emulating a communication equipment when communicating with the communication management unit and wireless access means for communication with a wireless access point of a ground communication network.

Advantageously, the ground communication network is an Internet network.

In a preferred embodiment, the emulating means is adapted to emulate one of a SATCOM communication equipment or a HF communication equipment.

In another preferred embodiment, the radio communication system further comprises activating means for allowing activation of the communication unit only when the aircraft is on ground.

Preferably, the activating means is controlled by control device receiving from one or more detector(s) a signal based on a value of one or several of the following parameters: weight-on-wheels, weight-off-wheels, brake, aircraft ground speed, aircraft air speed, flight information, time, door open or door closed.

The present invention also relates to a communication unit for a radio communication system for ACARS messages exchange between an aircraft and a ground centre comprising in the aircraft a communication management unit having a plurality of interfaces for connecting communication equipments among VHF, HF and SATCOM communication equipments, said communication unit including emulating means for emulating a communication equipment when communicating with the communication management unit and wireless access means for communication through an associated antenna means with a wireless access point of a ground communication network.

The present invention further relates to a method of upgrading an already installed and operating radio communication system for ACARS messages exchange between an aircraft and a ground centre, said radio communication system comprising in the aircraft a communication management unit having a plurality of interfaces for connecting communication equipments among VHF, HF and SATCOM communication equipments, the communication equipments being adapted via respective bi-directional channels to each communicate independently with the ground centre, in which at least one of the interfaces of the communication management unit is not fitted with a communication equipment, wherein the upgrading comprises the step of adding on a non-fitted interface of the communication management unit:

(i) a communication unit having a first interface and a second interface, through a first communication link between said first interface and the non-fitted interface of the communication management unit, (ii) a second communication link between said second interface and an interface of an associated antenna means for communication with the ground operation control centre, said communication unit including emulating means for emulating a communication equipment when communicating with the communication management unit and wireless access means for communication with a wireless access point of a ground communication network.

Figure 2:
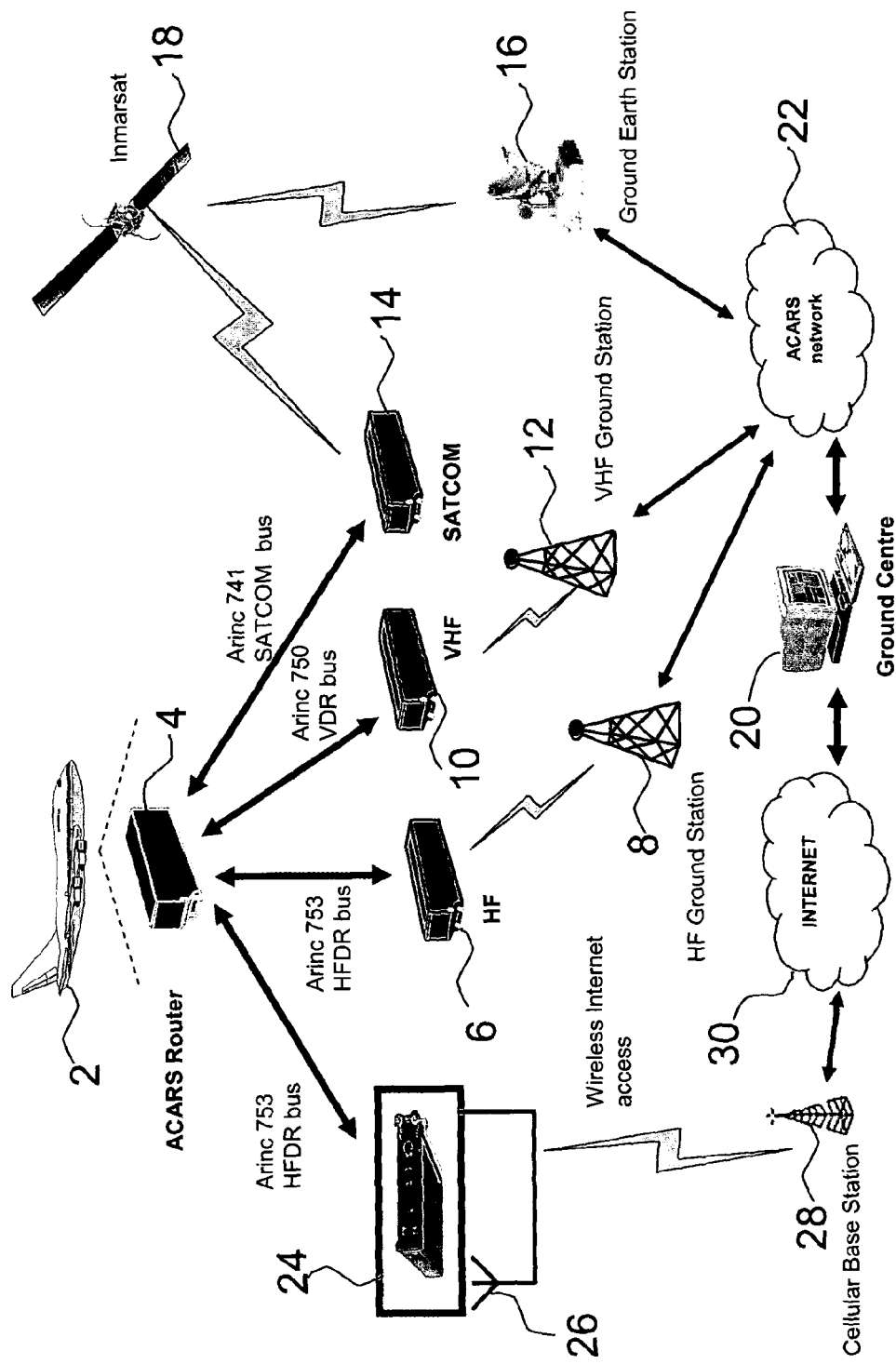
Figure 3:
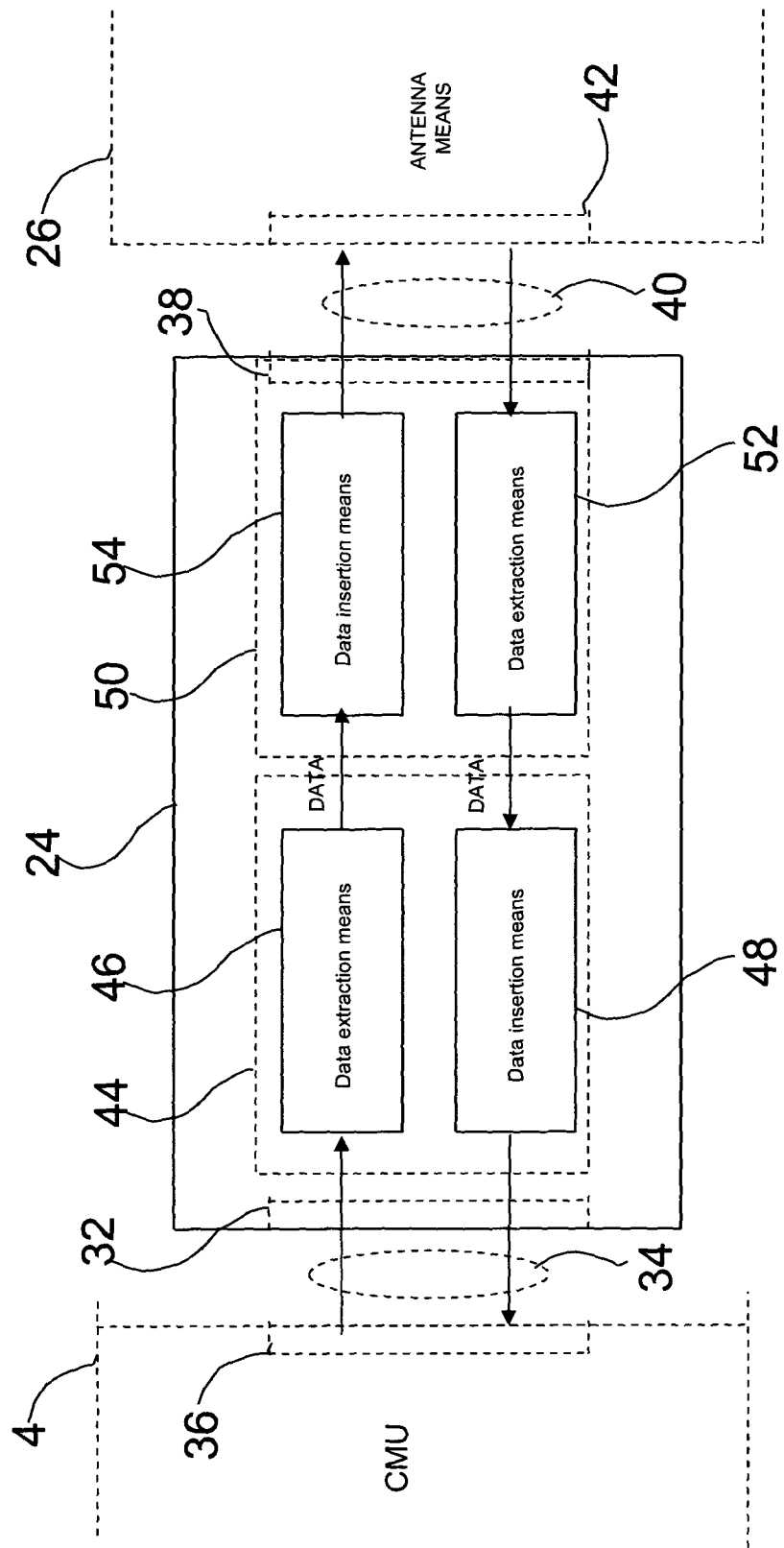
Figure 4:
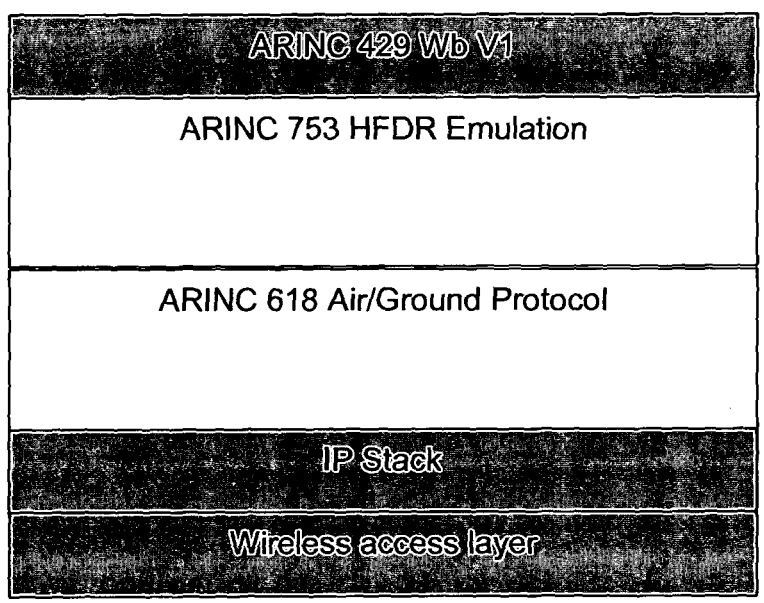

An exemplary embodiment of the radio communication system according to the invention will be described in detail, with reference to the following figures, wherein:

FIG. 1, already described, illustrates a conventional radio communication system for ACARS messages exchange;

FIG. 2 illustrates a radio communication system for ACARS messages exchange according to the invention;

FIG. 3 schematically illustrates an embodiment of the communication unit of the radio communication system according to the invention; and FIG. 4 illustrates the protocol layers handled in the communication unit.

FIG. 2 shows an embodiment of a radio communication system according to the invention. On this figure, the elements identical with those of the radio communication system described with respect of FIG. 1 are designated by the same numeral references.

Thus, in the example shown, the radio communication system comprises the same communication equipments as the conventional radio communication system, i.e. a HF communication equipment 6, a VHF communication equipment 10 and a SATCOM communication equipment 14. These communication equipments are connected to the communication management unit 4 by ARINC 429 buses or other standards and communicate with the communication management unit 4 with protocols specific to the respective types of communication equipments (e.g. ARINC 753, ARINC 741, ARINC 750).

According to the invention, the radio communication system further comprises a communication unit 24, and its associated antenna 26.

The communication unit 24 is connected to the control management unit 4 of the aircraft by a standard bus, such as an ARINC 429 bus. It comprises emulating means such that, from the communication management unit 4, it is seen as a communication equipment.

In the case represented, the communication unit 24 emulates a HF communication equipment like communication equipment 6. The interface with the communication management unit 4 is adapted for HFDR traffic and is termed ARINC 753. This is the preferred solution when a communication management unit 4 already installed and operating in an aircraft has one HF interface not fitted with a HF communication equipment. In such case, it is very simple to upgrade the conventional radio communication system to a radio communication system according to the invention. It needs no more than connecting a communication unit comprising means for emulating a HF communication equipment to the available HF interface of the communication management unit.

It is to be noted that it would alternatively be possible, and of identical interest, to connect to a communication management unit 4 a communication unit provided with means for emulating a SATCOM communication equipment if the communication management unit already installed and operating in an aircraft would have a SATCOM interface still available.

Further, according to the invention, the communication unit 24 is seen as a wireless terminal when communicating with a ground telecommunication network, i.e. it communicates with a wireless access point 28 of a telecommunication network. The wireless access point may be e.g. a cellular base station, as shown on the figure, of a GSM, GPRS, or 3G network or a WIFI access point or any other device adapted to transmit data on a wireless channel. The communication then goes on through a ground telecommunication network 30 to reach the ground centre 20. In the example shown, the communication is carried out on ground through the Internet, which is presently the preferred telecommunication network in view of the low communication costs. However, any other telecommunication protocol (such as e.g. ATM) may also be used.

The communication unit 24 may be used for transmitting any kind of ACARS messages. However, because of the certification and coverage issues, it would primarily not be intended for transmission of ATS messages. It is preferred that the radio communication system be designed such that only AOC messages be handled by the communication unit 24.

For safety reasons, in particular to avoid any possible interference with other electrical devices in the aircraft, the communication unit 24, or at least the communication with the associated antenna 26 may be automatically deactivated when the aircraft is in-flight. Activation of the communication unit 24 would then be possible only upon a control device receiving from at least a detector a signal clearly indicating that the aircraft is on ground. The detectors could provide a signal based on a value of one or several of the following parameters: weight-on-wheels, weight-off-wheels, brake, aircraft ground speed, aircraft air speed, flight information, time, door open, door closed, etc FIG. 3 schematically illustrates an embodiment of the communication unit 24 of FIG. 2. It comprises a first interface 32 connected by a HF bus 34 to an interface 36 of the communication management unit 4. It further comprises a second interface 38 connected by an appropriate communication link 40 to an interface 42 of the antenna means 26.

The communication unit 24 comprises an emulating means 44 for emulating an HF communication equipment when communicating with the communication management unit 4. This emulating means 44 comprises a data extraction means 46 for extracting the DATA from the frame of the signal received from the communication management unit 4 and a data insertion means 48 for inserting DATA to be transmitted to the communication management unit 4.

On the side of its second interface 38, the communication unit 24 comprises a wireless access means 50 for properly handling the communication with the cellular base station 28 (FIG. 2). This wireless access means 50 comprises a data extraction means 52 for extracting the DATA from the frame of the signal received from the cellular base station 28 and a data insertion means 52 for inserting the DATA to be transmitted to the cellular base station 28.

The insertion and extraction functions of the communication unit 24 are preferably implemented as a software run by processor.

FIG. 4 shows the protocol layers that may be handled by the software of the communication unit. These protocol layers include:
- an ARINC 429 Wb protocol layer that interfaces the communication unit 24 with the ACARS communication management unit 4 over the 429 bus dedicated to HFDR,
- an ARINC 753 HFDR Emulation protocol layer that emulates the behavior of an ARINC 753 HFDR communication equipment,
- an ARINC 618 Air/Ground protocol layer that implements the ground part of the ARINC 618 communication protocol,
- an IP stack protocol layer that provides all the protocols requires to communicate over the Internet, and
- a Wireless access protocol layer that gives access to Internet through a wireless service.

While the present invention has been described in connection with what is considered to be the most practical and preferred embodiment, it is to be understood that the invention is not limited to the disclosed embodiment, but on the contrary, it is intended to cover various modifications and equivalent arrangements included within the scope of the appended claims.

The invention claimed is:

1. A radio communication system for ACARS messages exchange between an aircraft (2) and a ground centre (20) comprising, in the aircraft:
a communication management unit (4) having a plurality of interfaces connecting communication equipments among VHF, HF and SATCOM communication equipments (6, 10, 14),
the communication equipments being adapted, via respective bi-directional channels, to each communicate independently with the ground center (20); and
a communication unit (24) having
a first interface (32) and a second interface (38),
a first communication link (34) between i) said first interface (32) and ii) an interface (36) of the communication management unit (4), and
a second communication link (40) between i) said second interface (38) and ii) an interface (42) of an associated antenna means (26) for communication with the ground center (20),
said communication unit (24) including emulating means (44) for emulating a communication equipment when communicating with the communication management unit (4) and wireless access means (50) for communication with a wireless access point (28) of a ground communication network (30), wherein,
the communication management unit (4) has one HF interface not fitted with an HF communication equipment,
the communication management unit (4) is connected to each radio communication equipment by a ARINC 429 bus,
the communication unit (24) connected to the control management unit (4) by the ARINC 429 bus,
the emulation means configured to have the communication unit (24) emulate an HF communication equipment communication equipment (6) via the one interface of the communication management unit (4) so that, from the communication management unit (4), the communication unit (24) is seen as the HF radio communication equipment;
the communication unit (24), operating under the emulating means, being seen as a wireless terminal when communicating with a ground telecommunication network, the communication carried out on ground through an Internet link,
the communication unit (24), operating under the emulating means, configured for transmitting ACARS messages including ATS messages.

2. A radio communication system according to claim 1, wherein,
the communication unit (24) is configured to be automatically de-activated when the aircraft is in-flight; and
a control device receiving from at least a detector a signal clearly indicating that the aircraft is on ground, the control device arranged to activation of the communication unit (24) only upon receiving from at least the detector the signal clearly indicating that the aircraft is on the ground.

3. A radio communication system for ACARS messages exchange between an aircraft (2) and a ground centre (20) comprising, in the aircraft:
a communication management unit (4) having a plurality of interfaces connecting communication equipments among VHF, HF and SATCOM communication equipments (6, 10, 14),
the communication equipments being adapted, via respective bi-directional channels, to each communicate independently with the ground center (20); and
a communication unit (24) having
a first interface (32) and a second interface (38),
a first communication link (34) between i) said first interface (32) and ii) an interface (36) of the communication management unit (4), and
a second communication link (40) between i) said second interface (38) and ii) an interface (42) of an associated antenna means (26) for communication with the ground center (20),
said communication unit (24) including emulating means (44) for emulating a communication equipment when communicating with the communication management unit (4) and wireless access means (50) for communication with a wireless access point (28) of a ground communication network (30), wherein,
the communication management unit (4) has one HF interface not fitted with a SATCOM communication equipment,
the communication management unit (4) is connected to each radio communication equipment by a ARINC 429 bus,
the communication unit (24) connected to the control management unit (4) by the ARINC 429 bus,
the emulation means configured to have the communication unit (24) emulate a SATCOM communication equipment communication equipment (6) via the one interface of the communication management unit (4) so that, from the communication management unit (4), the communication unit (24) is seen as the SATCOM radio communication equipment;
the communication unit (24), operating under the emulating means, being seen as a wireless terminal when communicating with a ground telecommunication network, the communication carried out on ground through an Internet link,
the communication unit (24), operating under the emulating means, configured for transmitting ACARS messages including ATS messages.

4. A radio communication system according to claim 3, wherein,
the communication unit (24) is configured to be automatically de-activated when the aircraft is in-flight; and
a control device receiving from at least a detector a signal clearly indicating that the aircraft is on ground, the control device arranged to activation of the communication unit (24) only upon receiving from at least the detector the signal clearly indicating that the aircraft is on the ground.

* * * * *

UNITED STATES PATENT AND TRADEMARK OFFICE
CERTIFICATE OF CORRECTION

| | |
|---|---|
| PATENT NO. | : 8,416,732 B2 |
| APPLICATION NO. | : 12/447098 |
| DATED | : April 9, 2013 |
| INVENTOR(S) | : Alain Jean-Michel Bothorel |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 407 days.

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,416,732 B2                                                    Page 1 of 1
APPLICATION NO.   : 12/447098
DATED             : April 9, 2013
INVENTOR(S)       : Alain Jean-Michel Bothorel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 759 days.

Signed and Sealed this
First Day of September, 2015

Michelle K. Lee
*Director of the United States Patent and Trademark Office*